(12) United States Patent
Shekhar et al.

(10) Patent No.: US 8,717,909 B1
(45) Date of Patent: May 6, 2014

(54) METHODS AND APPARATUS FOR ROUTE INSTALLATION ACKNOWLEDGEMENT AND ACKNOWLEDGEMENT AGGREGATION IN BGP

(75) Inventors: Ravi Shekhar, Sunnyvale, CA (US); Jaihari Loganathan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 71 days.

(21) Appl. No.: 13/197,212

(22) Filed: Aug. 3, 2011

(51) Int. Cl.
*G01R 31/08* (2006.01)

(52) U.S. Cl.
USPC ............ 370/248; 370/241; 370/401; 370/216

(58) Field of Classification Search
None
See application file for complete search history.

(56) References Cited

U.S. PATENT DOCUMENTS

| | | | |
|---|---|---|---|
| 2004/0034702 A1* | 2/2004 | He | 709/224 |
| 2005/0129017 A1* | 6/2005 | Guingo et al. | 370/390 |
| 2006/0198321 A1* | 9/2006 | Nadeau et al. | 370/254 |
| 2009/0213779 A1* | 8/2009 | Zhang et al. | 370/315 |
| 2012/0093154 A1* | 4/2012 | Rosenberg et al. | 370/392 |

* cited by examiner

*Primary Examiner* — Anez Ebrahim
(74) *Attorney, Agent, or Firm* — Cooley LLP

(57) ABSTRACT

In some embodiments, an apparatus includes a route reflector implemented in at least one of a memory or a processing device. The route reflector is configured to be included within a switch fabric system. The route reflector is configured to receive, from a network management module, an instruction to install a route associated with a multi-stage switch, and send the instruction to install to a route target network control entity associated with the multi-stage switch. The route reflector is also configured to receive, from the route target network control entity, a first acknowledgement signal indicating that the route was successfully installed at the route target network control entity. The route reflector is configured to send a second acknowledgement signal to the network management module in response to receiving the first acknowledgement signal.

20 Claims, 6 Drawing Sheets

# METHODS AND APPARATUS FOR ROUTE INSTALLATION ACKNOWLEDGEMENT AND ACKNOWLEDGEMENT AGGREGATION IN BGP

BACKGROUND

Some embodiments described herein relate generally to switch fabric systems, and, in particular, to methods and apparatus for providing and aggregating route installation acknowledgements based on border gateway protocol (BGP) within a switch fabric system.

In some known switch fabric systems, when a route is introduced in BGP, receipts of the route do not provide any explicit acknowledgement on route installation to the originator of the route. Thus, the originator of the route does not have information on whether or when the intended recipients of the route have received and/or installed the route.

Some other known switch fabric systems use route reflectors to distribute route information. In such switch fabric systems, the originator of a route typically does not know the ultimate recipients of the route. Furthermore, with multiple route reflectors used in such switch fabric systems, typically, no single BGP node knows about all the receipts of a route. Therefore, even though one-hop acknowledgement for route installation may be available in some scenarios, the originator of a route, however, still does not receive all the acknowledgements on route distribution and installation from the intended ultimate recipients of the route.

Accordingly, a need exists for a mechanism to provide a route installation acknowledgement from receipts of a route based on BGP in a switch fabric system. Additionally, a need exists for a multi-hop aggregation mechanism for aggregating route installation acknowledgements when route reflectors are used in the switch fabric system.

SUMMARY

In some embodiments, an apparatus includes a route reflector implemented in at least one of a memory or a processing device. The route reflector is configured to be included within a switch fabric system. The route reflector is configured to receive, from a network management module, an instruction to install a route associated with a multi-stage switch, and send the instruction to install to a route target network control entity associated with the multi-stage switch. The route reflector is also configured to receive, from the route target network control entity, a first acknowledgement signal indicating that the route was successfully installed at the route target network control entity. The route reflector is configured to send a second acknowledgement signal to the network management module in response to receiving the first acknowledgement signal.

DETAILED DESCRIPTION

Figure 1:
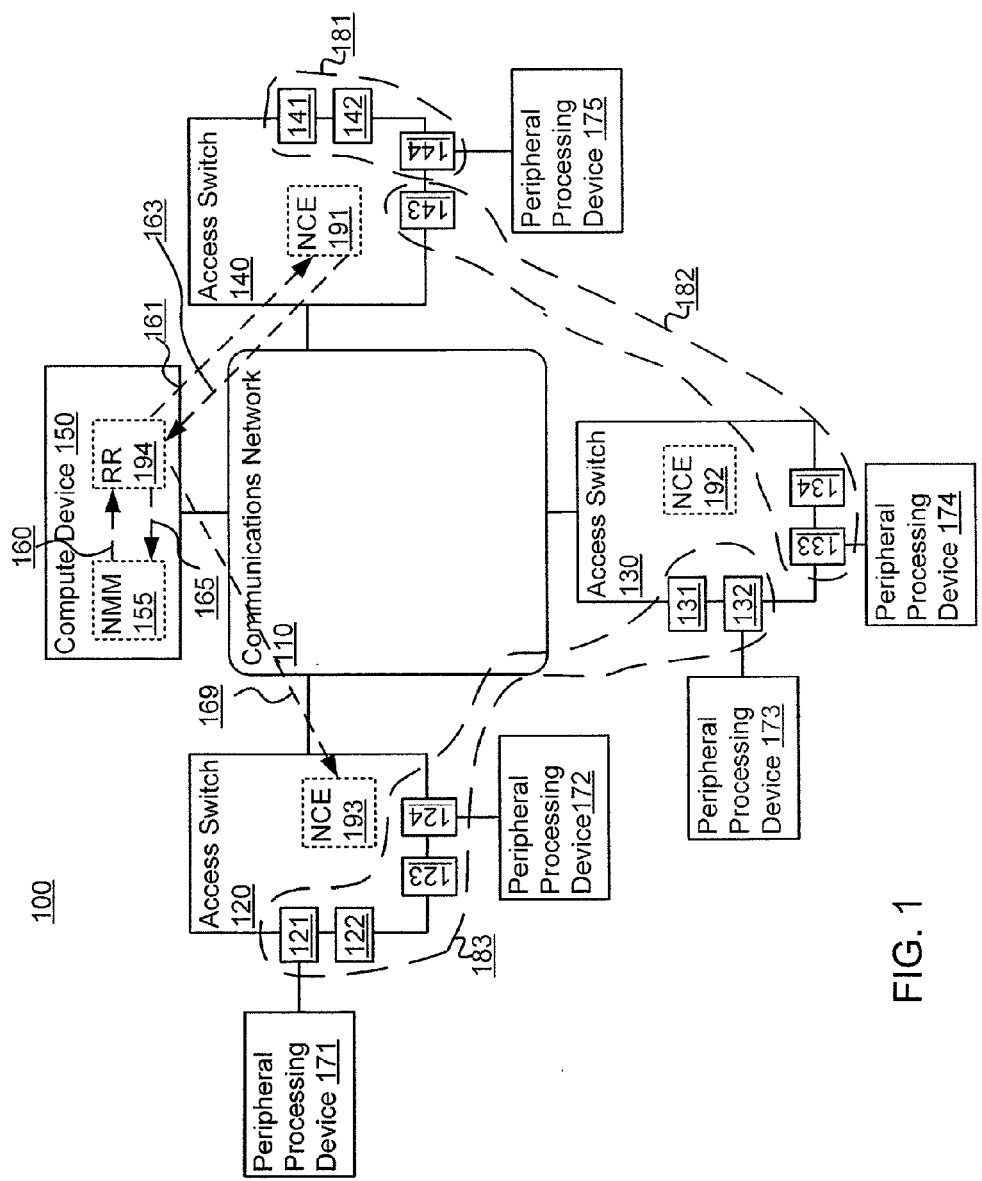
FIG. 1 is a schematic illustration of a switch fabric system, according to an embodiment.

In some embodiments, an apparatus includes a route reflector that is involved in distributing route installation and route update information to network control entities within a multi-stage switch. For example, the route reflector can be configured to receive an instruction to install a route from a network management module, and send the instruction to install to two route target network control entities from a set of network control entities within the multi-stage switch. The route reflector can send the instruction to install via an instruction signal including an acknowledgement request. Subsequently, if the route is successfully installed at the two route target network control entities, the route reflector can receive an acknowledgement signal from each of the two route target network control entities, indicating a successful installation of the route at each of the two route target network control entities. In response to receiving both of the two acknowledgement signals, the route reflector can be configured to send a third acknowledgement signal to the network management module. Otherwise, if the route is not successfully installed at one or both of the route target network control entities, the route reflector does not receive an acknowledgement signal from at least one of the two route target network control entities. As a result, the route reflector can be configured to send an error signal to the network management module.

Furthermore, after receiving the third acknowledgement signal from the route reflector, the network management module can send a route update associated with the route to the route reflector, which is then configured to forward the route update to each network control entity from the set of network control entities within the multi-stage switch, including the two route target network control entities. In some embodiments, the route reflector can be a border gateway protocol (BGP) route reflector associated with a control plane of the multi-stage switch, and the route reflector can send the instruction to install to a route target network control entity via a BGP instruction signal. In some embodiments, the route can be associated with a link aggregation group (LAG) membership update, or a multicast flood tree update, etc.

As used herein, a module can be, for example, any assembly and/or set of operatively-coupled electrical components, and can include, for example, a memory, a processor, electrical traces, optical connectors, software (executing in hardware) and/or the like.

As used herein, the singular forms "a," "an" and "the" include plural referents unless the context clearly dictates otherwise. Thus, for example, the term "a switch fabric" is intended to mean a single switch fabric or a combination of switch fabrics.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

FIG. 1 is a schematic diagram that illustrates a switch fabric system 100, according to an embodiment. The switch fabric system 100 includes a communications network 110; multiple access switches 120, 130, 140, which include network control entities (NCE) 191-193, respectively; a compute device 150, which includes network management module (NMM) 155 and route reflector (RR) 194; and multiple peripheral processing devices 171-175. Communications network 110 can be any suitable communications network that operatively couples access switches 120, 130, 140 to the other access switches 120, 130, 140. Additionally, communications network 110 can operatively couple compute device 150 to access switches 120, 130, 140. In some embodiments, communications network 110 includes a data plane portion and a control plane portion.

The data plane portion of communications network 110 facilitates transmission of data between access switches 120, 130, 140. In some embodiments, the data plane portion of communications network 110 is a switch fabric having one or more stages. For example, the data plane portion of communications network 110 can be a Clos switch fabric network (e.g., a non-blocking Clos network, a strict sense non-blocking Clos network, a Benes network) having multiple stages of switching modules (e.g., integrated Ethernet switches). Such a switch fabric can include any number of stages. In some embodiments, for example, the switch fabric can include three, five, seven or nine stages. The data plane portion of communications network 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of communications network 110 can be (e.g., can function as) a single consolidated switch (e.g., a single large-scale consolidated L2/L3 switch). In other words, the data plane portion of communications network 110 can operate as a single logical entity (e.g., a single logical network element). Similarly stated, the data plane portion of communications network 110 can be part of a single logical hop between a first access switch 120, 130, 140 and a second access switch 120, 130, 140 (e.g., along with the data paths between access switches 120, 130, 140 and communications network 110). The data plane portion of communications network 110 can couple (e.g., indirectly connect, facilitate communication between) peripheral processing devices 171-175. In some embodiments, communications network 110 can communicate via interface devices (not shown in FIG. 1) operable to transmit data at a rate of at least 10 Gb/s. In some embodiments, communications network 110 can communicate via interface devices (e.g., Fibre-Channel interface devices) operable to transmit data at a rate of for example, 2 Gb/s, 4, Gb/s, 8 Gb/s, 10 Gb/s, 40 Gb/s, 100 Gb/s and/or faster link speeds.

Although the data plane portion of communications network 110 can be logically centralized, the implementation of the data plane portion of communications network 110 can be highly distributed, for example, for reliability. For example, portions of the data plane portion of communications network 110 can be physically distributed across, for example, many chassis. In some embodiments, for example, a processing stage of the data plane portion of communications network 110 can be included in a first chassis and another processing stage of the data plane portion of communications network 110 can be included in a second chassis. Both of the processing stages can logically function as part of a single consolidated switch (e.g., within the same logical hop) but have a separate single physical hop between respective pairs of processing stages.

The control plane portion of communications network 110 facilitates transmission of control signals (e.g., configuration information, route information, etc.) between network control entities 191-193 and route reflector 194. As described in further detail herein, route information such as instructions to install a route, acknowledgement signals on route installation, route updates, etc., can be transmitted between network control entities 191-193 and route reflector 194 via the control plane portion of communications network 110. In some embodiments, the control plane portion of communications network 110 includes direct links between route reflector 194 and network control entities 191-193. In some other embodiments, the control plane portion of communications network 110 includes intermediate modules and/or switches (not shown in FIG. 1) to operatively couple route reflector 194 with network control entities 191-193.

Peripheral processing devices 171-175 are operatively coupled to each other by remaining portions of the switch fabric system 100. Peripheral processing devices 171-175 can be, for example, compute nodes, service nodes, routers, and storage nodes, as described in further detail herein. In some embodiments, for example, peripheral processing devices 171-175 include servers, storage devices, gateways, workstations, and/or the like.

Peripheral processing devices 171-175 can be operatively coupled to one or more ports 121-124, 131-134, 141-144 of access switches 120, 130, 140 using any suitable connection such as, for example, an optical connection (e.g., an optical cable and optical connectors), an electrical connection (e.g., an electrical cable and electrical connectors), and/or the like. Similarly stated, each port 121-124, 131-134, 141-144 provides a communication interface through which a peripheral processing device 171-175 can be operatively coupled to an access switch 120, 130, 140, as described in further detail herein. As such, peripheral processing devices 171-175 can send data (e.g., data packets, data cells, etc.) to and receive data from access switches 120, 130, 140. In some embodiments, the connection between peripheral processing devices 171-175 and access switches 120, 130, 140 is a direct link. Such a link can be said to be a single physical hop link. In other embodiments, peripheral processing devices 171-175 can be operatively coupled to access switches 120, 130, 140 via intermediate modules (not shown in FIG. 1). Such a connection can be said to be a multiple physical hop link.

Each access switch 120, 130, 140 can be any device that operatively couples peripheral processing devices 171-175 to communications network 110. In some embodiments, for example, access switches 120, 130, 140 can be edge devices, input/output modules, top-of-rack devices and/or the like. Structurally, access switches 120, 130, 140 can function as both source access switches and destination access switches. Accordingly, access switches 120, 130, 140 can send data (e.g., a data stream of data packets and/or data cells) to and receive data from communications network 110, and to and from the connected peripheral processing devices 171-175.

Each of access switches 120, 130, 140 is operable to communicate with the other access switches 120, 130, 140 via communications network 110 (e.g., within both a data plane portion and a control plane portion). Specifically, the data plane portion of communications network 110 provides any-to-any connectivity between access switches 120, 130, 140 at relatively low latency. For example, the data plane portion of communications network 110 can transmit (e.g., convey) data between access switches 120, 130, 140. In some embodiments, communications network 110 can have at least hundreds or thousands of ports (e.g., egress ports and/or ingress ports) through which access switches 120, 130, 140 can transmit and/or receive data.

As shown in FIG. 1, access switches 120, 130, 140 can host network control entities 191-193 to manage ports 121-124, 131-134, 141-144 of access switches 120, 130, 140. Accordingly, network control entities 191-193 can be part of a control plane of the switch fabric system 100. Each network control entity 191-193 can be a process, application, virtual machine, and/or some other software module (executing in hardware) or a hardware module executed at access switch 120, 130, 140. As such, instructions that implement network control entity 191-193 can be stored within a memory of access switch 120, 130, 140 and executed at a processor of access switch 120, 130, 140.

Each network control entity 191-193 can manage ports 121-124, 131-134, 141-144 of access switches 120, 130, 140. For example, as shown in FIG. 1, network control entity 191 is operable to manage ports 141, 142, 144 associated with the group of ports 181, network control entity 192 is operable to manage ports 133, 134, 143 associated with the group of ports 182, and network control entity 193 is operable to manage ports 121, 122, 123, 124, 131, 132 associated with the group of ports 183. In some embodiments, each network control entity 191-193 can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its group of ports 181, 182, 183, monitor a state and/or status of peripheral processing devices (e.g., peripheral processing devices 171-175) associated with its group of ports 181, 182, 183, and/or manage and maintain other information associated with the peripheral processing devices and/or ports associated with its group of ports 181, 182, 183, respectively.

In some embodiments, a network control entity can control and/or manage ports at an access switch at which the network control entity is located (e.g., network control entity 191 manages the group of ports 181). In some other embodiments, a network control entity can also control and/or manage ports at an access switch other than the access switch at which the network control entity is located (e.g., network control entity 193 manages ports 131 and 132, and network control entity 192 manages port 143). In such embodiments, network management module 155 within compute device 150 has flexibility to assign each port 121-124, 131-134, 141-144 to a network control entity 191-193 based on, for example, processing capacity. Additionally, in such embodiments, network management module 155 is not constrained by the physical location of network control entities 191-193 and/or the ports 121-124, 131-134, 141-144 when assigning ports 121-124, 131-134, 141-144 to a network control entity 191-193.

Figure 2:
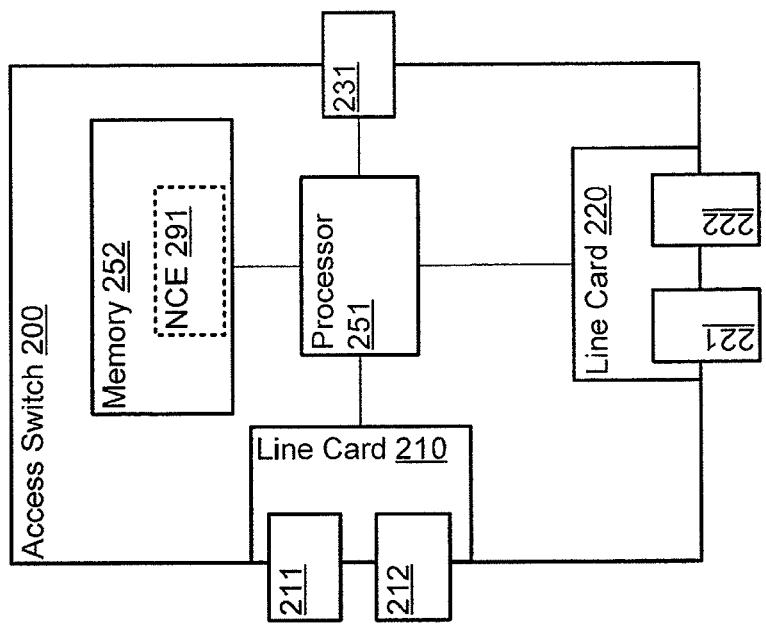
FIG. 2 is a system block diagram of an access switch that includes a network control entity, according to an embodiment.

FIG. 2 is a system block diagram of an access switch 200 substantially similar to access switches 120, 130, 140 in FIG. 1, according to an embodiment. Access switch 200 includes processor 251; memory 252, which includes network control entity 291; line cards 210, 220; and port 231. Processor 251 is operatively coupled to memory 252, line card 210, line card 220 and port 231. Line card 210 includes ports 211 and 212. Line card 220 includes ports 221 and 222. In some embodiments, line cards 210 and/or 220 include one or more processors and/or memories.

Similar to ports 121-124, 131-134, 141-144 of access switches 120, 130, 140 shown in FIG. 1, ports 211, 212, 221 and 222 can communicate with peripheral processing devices. For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can allow access switch 200 to communicate with peripheral processing devices, such as, for example, computer servers (servers), via a common protocol such as Ethernet or Fibre Channel. In some embodiments, some of ports 211, 212, 221 and 222 implement one protocol such as Ethernet and others of ports 211, 212, 221 and 222 implement a different protocol such as Fibre Channel. Thus, access switch 200 can be in communication with multiple peripheral processing devices using homogeneous or heterogeneous physical layers and/or protocols via ports 211, 212, 221 and 222.

Port 231 can be in communication with other access switches via a communications network such as a switch fabric (e.g., a control plane portion of communications network 110). Port 231 can be part of one or more network interfaces (e.g., a 40 Gigabit (Gb) Ethernet interface, a 100 Gb Ethernet interface, etc.) through which access switch 200 can send signals to and/or receive signals from a communications network. The signals can be sent to and/or received from the communications network via an electrical link, an optical link and/or a wireless link operatively coupled to access switch 200. In some embodiments, access switch 200 can send signals to and/or receive signals from the communications network based on one or more protocols (e.g., an Ethernet protocol, a multi-protocol label switching (MPLS)

protocol, a Fibre Channel protocol, a Fibre-Channel-over Ethernet protocol, an Infiniband-related protocol).

In some embodiments, port 231 can implement a different physical layer and/or protocol than those implemented at ports 211, 212, 221 and 222. For example, port 211, 212, 221 and 222 can communicate with peripheral processing devices using a protocol based on data packets and port 231 can communicate via a switch fabric using a protocol based on data cells. Said differently, access switch 200 can be an edge device of a network switch such as a distributed network switch.

In some embodiments, access switch 200 can prepare a data packet (e.g., an Ethernet packet) to enter a communications network (e.g., communications network 110). For example, access switch 200 can forward, classify, and/or modify the packet encapsulation (e.g., modify, add and/or remove a header portion, footer portion and/or any other identifier included within the data packet) of a data packet prior to sending the data packet to the communications network. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

In some embodiments, access switch 200 can send a control signal to a communications network (e.g., communications network 110) to distribute to other access switches or a compute device(s). The control signal can include protocol information (e.g., route information, configuration information, etc.) associated with one or a group of ports of access switch 200. Access switch 200 can also receive such a control signal sent from other access switches or a compute device(s) over a communications network.

In some embodiments, memory 252 can be, for example, a random-access memory (RAM) (e.g., a dynamic RAM, a static RAM), a flash memory, a removable memory, and/or so forth. In some embodiments, instructions that implement network control entity 291 can be stored within memory 252 and executed at processor 251, as shown in FIG. 2. Similar to network control entities 191-193 in FIG. 1, network control entity 291 can be, for example, a process, application, virtual machine, and/or some other software module (executing in hardware) or a hardware module configured to manage one or more ports (e.g., port 211, 212, 221, 222, 231) of access switch 200. For example, network control entity 291 can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with a group of ports, monitor a state and/or status of peripheral processing devices associated with the group of ports, and/or manage and maintain other information associated with the peripheral processing devices and/or ports associated with the group of ports.

Particularly, network control entity 291 can manage and/or maintain, within memory 252, a data structure (e.g., a routing table, a database, etc.) that is used to store route information associated with forwarding data received at access switch 200 in a switch fabric system. As described in further detail herein, a network control entity of an access switch, such as network control entity 291 of access switch 200, can be configured to receive an instruction to install a new route into the switch fabric system, and then install the route in the data structure within memory 252 of access switch 200.

Returning to FIG. 1, compute device 150 can host management modules, processes and/or functions associated with the switch fabric system 100. As shown in FIG. 1, compute device 150 can host a network management module 155 and a route reflector 194. As described in further detail herein, route reflector 194 can function as an intermediary relay between network management module 155 and network control entities 191-193. Network management module 155 and route reflector 194 can be part of the control plane of the switch fabric system 100.

Network management module 155 can be a process, application, virtual machine, and/or some other software module (executing in hardware) or a hardware module executed at compute device 150. Network management module 155 can divide and/or partition the ports 121-124, 131-134, 141-144 of access switches 120, 130, 140 into the groups of ports 181, 182, 183 to be managed by network control entities 191-193. As such, network management module 155 can associate the group of ports 181 with network control entity 191, the group of ports 182 with network control entity 192 and the group of ports 183 with network control entity 193. Additionally, network management module 155 can also monitor an available processing capacity of each network control entity 191-193 and initiate and/or terminate network control entities 191-193 when the available processing capacity of a network control entity 191-193 crosses (e.g., falls below) a first threshold and/or crosses (e.g., exceeds) a second threshold.

In some embodiments, network management module 155 can store (e.g., in a memory) a configuration file associated with configuration information (e.g., port protocol information, network segment assignment information, port assignment information, peripheral processing device information, etc.) and/or forwarding-state information (e.g., routing information, port identifiers, network segment identifiers, peripheral processing device identifiers, etc.) for the switch fabric system 100. In some embodiments, network management module 155 can send a portion of the forwarding-state information associated with a respective group of ports 181, 182, 183 to the related network control entities 191-193 via the control plane portion of communications network 110.

In use, network management module 155 can initiate network control entities 191-193 (by sending a signal to access switches 120, 130, 140 via the control plane portion of communications network 110, respectively) and, based on a processing capacity of network control entities 191-193, assigns each port 121-124, 131-134, 141-144 to a network control entity 191-193. As shown in FIG. 1, for example, network management module 155 associates ports 121-124, 131 and 132 (group of ports 183) with network control entity 193; ports 133, 134 and 143 (group of ports 182) with network control entity 192; and ports 141, 142 and 144 (group of ports 183) with network control entity 191.

Network management module 155 can also initiate one or more intermediary route reflectors by sending a control signal to the route reflectors. For example, network management module 155 can initiate route reflector 194 by sending a control signal to route reflector 194 via other portions of compute device 150. As shown and described with respect to FIGS. 4-5, each network control entity 191-193 can send control signals (e.g., acknowledgement signals) to and receive control signals (e.g., instructions to install a route) from network management module 155 through route reflector 194.

Figure 3:
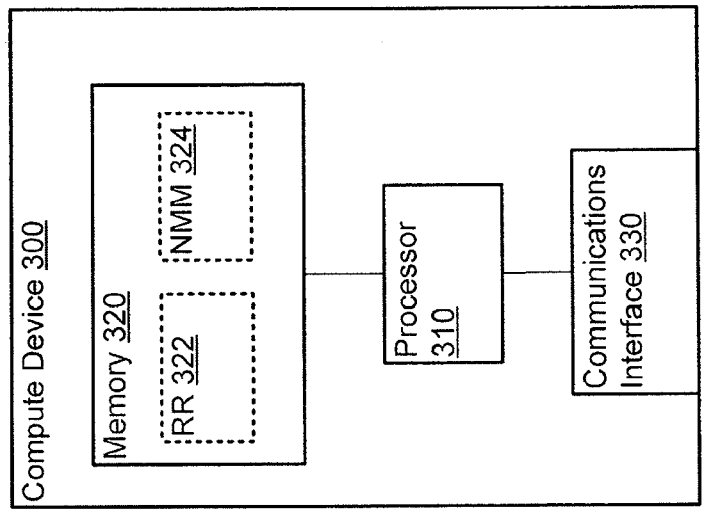
FIG. 3 is a system block diagram of a compute device that includes a network management module and a route reflector, according to an embodiment.

FIG. 3 is a system block diagram of a compute device 300 substantially similar to compute device 150 in FIG. 1, according to an embodiment. Compute device 300 includes processor 310; memory 320, which includes network management module 324 and route reflector 322; and communications interface 330. Processor 310 is operatively coupled to memory 320 and communications interface 330. Compute device 300 can communicate with other compute devices, peripheral processing devices and/or access switches via communications interface 330.

As illustrated in FIG. 3, compute device 300 can host a route reflector 322 and a network management module 324 similar to route reflector 194 and network management module 155, respectively, of FIG. 1. Route reflector 322 and network management module 324 can be processes, applications, virtual machines, and/or some other software modules (executing in hardware) or a hardware module that is executed at compute device 300. In some embodiments, for example, instructions that implement route reflector 322 and/or network management module 324 can be stored at memory 320 and executed at processor 310.

As described in further detail herein, route reflector 322 and network management module 324 of compute device 300 can be involved in distributing route information in a switch fabric system that hosts compute device 300. Specifically, route reflector 322 can be configured to receive route information, such as instructions to install a new route, route updates, etc., from network management module 324, and then forward the received route information to one or more route target network control entities within the switch fabric system. On the other hand, route reflector 322 can be configured to receive acknowledgement signals or error signals associated with route installations at the route target network control entities, and then send an acknowledgement signal or an error signal to network management module 324, reporting the acknowledgement signals and/or error signals received at route reflector 322 from the route target network control entities.

In some embodiments, memory 320 contains a non-transitory processor-readable medium that stores code representing instructions to be executed by processor 310. Some of the instructions executed by processor 310 can cause route reflector 322 to execute a series of operations with respect to distributing route information within a switch fabric system that hosts compute device 300, such as receiving, sending, or forwarding route information including instructions to install a new route, route updates, acknowledgement signals, etc. Distributing route information in a switch fabric system using a network management module, one or more route reflectors, and one or more network control entities is described in further detail below with respect to FIGS. 4-5.

In some embodiments, compute device 300 can be dedicated to hosting route reflector 322 and/or network management module 324. In other words, compute device 300 can allocate all or substantially all of its computing resources (e.g., processing capacity and memory) to route reflector 322 and/or network management module 324. In some embodiments, compute device 300 can host other processes, applications, virtual machines, and/or software modules (executing in hardware) in addition to route reflector 322 and/or network management module 324. For example compute device 300 can be a general purpose compute device or compute node that hosts multiple processes, applications, virtual machines, and/or software modules (executing in hardware).

Returning to FIG. 1, similar to route reflector 322 and network management module 324, route reflector 194 and network management module 155 of compute device 150 can be configured to distribute route information to, and receive acknowledgements (associated with the distributed route information) from, network control entities 191-193. In some embodiments, when a new route is introduced into the switch fabric system 100 by a network administrator for example, network management module 155 can be configured to send an instruction to install the new route to route reflector 194. Specifically, network module 155 can be configured to send an instruction signal (e.g., a control signal) containing the instruction to install the new route to route reflector 194, which is then configured to store the instruction to install in a memory of compute device 150 (e.g., memory 320 of compute device 300) that is associated with route reflector 194. For example, when a new route associated with forwarding data packets from compute device 150 to peripheral processing device 175 is introduced into the switch fabric system 100, network management module 155 is configured to send an instruction to install the new route to route reflector 194 via an instruction signal, shown as signal 160 in FIG. 1.

In some embodiments, a route that is intended to be installed at one or more network control entities within the switch fabric system can be associated with, for example, a link aggregation group (LAG) membership update, or a multicast flood tree update, etc. For example, upon a device operatively coupled to computer device 150 (not shown in FIG. 1) joining a LAG that is associated with access switch 120, network management module 155 can be configured to send an instruction to install a new route to network control entity 193 via route reflector 194. The new route is to be established between access switch 120 and the new member device of the LAG, such that access switch 120 is able to communicate with the device within the LAG. For another example, after a portion of communications network 110 is changed (e.g., a new device is connected to communications network 110, an existing device is disconnected from communications network 110, etc.), compute device 150 can be configured to distribute a multicast flood tree update instruction to access switches 120, 130 and 140, Specifically, network management module 155 can be configured to distribute the multicast flood tree update instruction to network control entities 191-193 via route reflector 194 and communications network 110. As a result, the routes that are associated with the multicast flood tree from compute device 150 to access switches 120, 130 and 140 and that are installed at network control entities 191-193 can be updated accordingly.

A new route included in an instruction to install can be associated with one or more route target network control entities, such that the new route is intended to be delivered to and installed at each of the route target network control entities. In some embodiments, the originator (e.g., network management module 155) of an instruction to install a new route, however, does not necessarily have the identity of all of the route target network control entities for the new route. Instead, the route target network control entities associated with the new route can be indicated by the originator of the instruction to install using a route-target attribute included in the instruction to install. Furthermore, route reflector 194 can be configured to identify the route target network control entities based on such a route-target attribute. Thus, network management module 155 does not need to explicitly identify the route target network control entities for an instruction to install in the instruction signal sent to route reflector 194. For example, when a new route associated with forwarding data packets from compute device 150 to peripheral processing device 175 is introduced, the instruction to install the new route includes a route-target attribute, which indicates that the instruction to install is intended to be delivered to and installed at a network control entity that manages a port coupled to peripheral processing device 175. Upon receiving such an instruction signal from network management module 155, route reflector 194 can be configured to determine that network control entity 191 is the intended route target network control entity based on the route-target attribute included in the instruction to install. Note that route reflector 194 can determine peripheral processing device 175 is coupled to port 144 of access switch 140, and network control entity 191 is operable to manage port 144.

In some embodiments, after sending an instruction to install a new route to route reflector 194, network management module 155 is configured to receive an indication or confirmation of whether the new route can be successfully installed at the route target network control entities or not. For example, a second route to be installed can use a first route, which was previously sent to one or more route target network control entities to be installed, as a reference route. Thus, network management module 155 is configured to receive a confirmation that the first route has been successfully installed at the route target network control entities, before sending an instruction to install the second route to route reflector 194. In such embodiments, the instruction to install, which is sent from network management module 155 to route reflector 194 via an instruction signal, can include an acknowledgement request. Specifically, the acknowledgement request included in the instruction to install indicates to route reflector 194 that an acknowledgement is requested from route reflector 194 to network management module 155 on whether the route has been successfully installed at the intended route target network control entities or not.

In the example of FIG. 1, a second route associated with sending data from peripheral processing device 171 to peripheral processing device 175 via compute device 150 (i.e., as an intermediary relay) can use the first route associated with forwarding data from compute device 150 to peripheral processing device 175 as a reference route. In other words, the second route is not installed at its associated route target network control entities (e.g., network control entity 191, 193) unless the first route is successfully installed at its associated route target network control entity (e.g., network control entity 191). Therefore, network management module 155 is configured to receive an indication or confirmation of whether the first route has been successfully installed at its associated route target network control entity or not. As a result, an acknowledgement request is included in the instruction signal (shown as signal 160 in FIG. 1) for installing the first route that is sent from network management module 155 to route reflector 194. Such an acknowledgement request indicates to route reflector 194 that an acknowledgement on whether or not the first route is successfully installed at the associated route target network control entity (e.g., network control entity 191) is requested by network management module 155.

Upon receiving an instruction to install a new route from network management module 155 via an instruction signal, route reflector 194 can be configured to identify one or more route target network control entities associated with the new route to be installed. Specifically, route reflector 194 can be configured to identify the route target network control entities associated with the new route based on a route-target attribute included in the instruction to install. Furthermore, route reflector 194 can be configured to store the information of the route target network control entities, which are identified based on the route-target attribute, in a memory (e.g., memory 320 of compute device 300 in FIG. 3) accessible to route reflector 194. Thus, route reflector 194 can be configured to retrieve the information of the route target network control entities and compare it with received acknowledgement signals, as described in further detail below.

For example, if a route-target attribute included in an instruction to install indicates that the instruction to install is intended to network control entities that manage ports of more than one access switches, route reflector 194 can be configured to determine the route target network control entities associated with such an instruction to install include network control entities 192 and 193. (Note that, in the example of FIG. 1, network control entity 192 is operable to manage ports 133, 134, 143 of access switches 130, 140, and network control entity 193 is operable to manage ports 121, 122, 123, 124, 131, 132 of access switches 120, 130.) Subsequently, route reflector 194 can be configured to store the information of the identified route target network control entities (i.e., network control entities 192 and 193) in a memory accessible to route reflector 194.

For another example, if a route-target attribute included in an instruction to install indicates that the instruction to install is intended to network control entities that manage a port coupled to a peripheral processing device, route reflector 194 can be configured to determine the route target network control entities associated with such an instruction to install include network control entities 191, 192 and 193. (Note that, in the example of FIG. 1, network control entity 191 is operable to manage port 144 that is coupled to peripheral processing device 175, network control entity 192 is operable to manage port 133 that is coupled to peripheral processing device 174, and network control entity 193 is operable to manage ports 121, 124 and 132 that are coupled to peripheral processing device 171, 172 and 173, respectively.) Subsequently, route reflector 194 can be configured to store the information of the identified route target network control entities (i.e., network control entities 191, 192 and 193) in a memory accessible to route reflector 194.

After the route target network control entities for an instruction to install are identified by route reflector 194, route reflector 194 can be configured to send the instruction to install to each of the route target network control entities via an instruction signal. Furthermore, if the instruction signal received at route reflector 194 from network management module 155 includes an acknowledgement request, the acknowledgement request is also included in each of the instruction signals that are sent from route reflector 194 to each of the route target network control entities. With the acknowledgement request, route reflector 194 can request an acknowledgement signal from each of the route target network control entities after the instruction to install is received and installed at the route target network control entities.

For example, network management module 155 can send an instruction to install a route, which is associated with forwarding data packets from compute device 150 to peripheral processing device 175, to route reflector 194 via an instruction signal (shown as signal 160 in FIG. 1). The instruction signal can include an acknowledgement request that indicates route reflector 194 is to provide an acknowledgement on installation of the route to network management module 155. After receiving the instruction to install, route reflector 194 is configured to identify a route target network control entity for the instruction to install, i.e., network control entity 191, and store the information in a memory accessible to route reflector 194 accordingly. Consequently, route reflector 194 is configured to send the instruction to install to network control entity 191 via an instruction signal through the control plane of communications network 110, shown as signal 161 in FIG. 1. Additionally, the instruction signal sent from route reflector 194 to network control entity 191 includes an acknowledgement request, which indicates network control entity 191 is to provide an acknowledgement on installation of the route to route reflector 194.

After a network control entity receives an instruction to install a new route from route reflector 194 via an instruction signal, the network control entity can be configured to install the route accordingly, at for example an access switch that hosts the network control entity. Specifically, the network control entity can store the route information in a data structure (e.g., a routing table, a database, etc.) within a memory of the access switch (e.g., memory 252 of access switch 200 in FIG. 2), which is used to store information associated with routing and/or forwarding data received at the access switch. Furthermore, the network control entity and/or other portions of the access switch can be configured to route and/or forward data received at the access switch according to the route information newly stored in the data structure. In the example of FIG. 1, after network control entity 191 receives the instruction to install a new route associated with forwarding data from compute device 150 to peripheral processing device 175, network control entity 191 is configured to install the new route by storing the route information in a routing table within a memory of access switch 140. Network control entity 191 and/or other portions of access switch 140 are further configured accordingly, such that data sent from compute device 150 to peripheral processing device 175 can be forwarded appropriately within access switch 140 to port 144, which is coupled to peripheral processing device 175.

If the instruction signal containing an instruction to install a new route sent from route reflector 194 to a route target network control entity includes an acknowledgement request, the route target network control entity can be configured to send an acknowledgement signal to route reflector 194 after successfully installing the new route at the route target network control entity. The acknowledgement signal can indicate to route reflector 194 that the new route was successfully installed at the route target network control entity. For example, route reflector 194 can send to network control entity 191 an instruction to install a new route, which is associated with forwarding data packets from compute device 150 to peripheral processing device 175, via an instruction signal including an acknowledgement request (shown as signal 161 in FIG. 1). Thus, after receiving the instruction to install and successfully installing the new route, network control entity 191 is configured to send an acknowledgement signal, which indicates the successful installation of the new route at network control entity 191, to route reflector 194 (shown as signal 163 in FIG. 1).

In some embodiments, if a route target network control entity receives an instruction to install via an instruction signal including an acknowledgement request from route reflector 194, but is unable to successfully install the new route, for example, within a predetermined amount of time, the route target network control entity can be configured to send an error signal to route reflector 194. The error signal is intended to indicate the unsuccessful installation of the new route at the route target network control entity. Alternatively, a route target network control entity that receives an instruction to install a new route from route reflector 194 can indicate to route reflector 194 an unsuccessful installation of the new route by not sending any signal (e.g., an acknowledgement signal, an error signal) to route reflector 194 within a predetermined period of time after receiving the instruction to install. Thus, if no signal is received from the route target network control entity by route reflector 194 within a certain amount of time after the instruction to install is sent from route reflector 194 to the route target network control entity, route reflector 194 can conclude that the new route has not been successfully installed at the route target network control entity, either because the instruction to install was not successfully received by the route target network control entity, or because the new route was received but not successfully installed at the route target network control entity. For example, route reflector 194 can send to network control entity 191 an instruction to install a new route, which is associated with forwarding data packets from compute device 150 to peripheral processing device 175, via an instruction signal including an acknowledgement request (shown as signal 161 in FIG. 1). After receiving the instruction to install but not able to successfully install the new route within a predetermined period of time, network control entity 191 is configured to send an error signal, which indicates that the installation of the new route was unsuccessful at network control entity 191, to route reflector 194 (shown as signal 163 in FIG. 1).

After receiving one or more acknowledgement signals indicating a successful installation of a new route from one or more route target network control entities, route reflector 194 can be configured to retrieve the stored information of the route target network control entities for the new route, and then compare it with the received acknowledgement signals to determine whether an acknowledgement signal has been received from every route target network control entity associated with the new route. If route reflector 194 determines that an acknowledgement signal has been received from every route target network control entity associated with the new route, route reflector 194 can be configured to send an acknowledgement signal to network management module 155 to indicate that the new route has been successfully installed at all intended route target network control entities. Otherwise, if route reflector 194 does not receive an acknowledgement signal indicating a successful installation of the new route from at least one of the route target network control entities within a predetermined amount of time, or alternatively, if route reflector 194 receives an error signal indicating an unsuccessful attempt to install the new route from at least one of the route target network control entities, route reflector 194 can be configured to send an error signal to network management module 155 to indicate that not all route target network control entities were successful in installing the new route.

In the example of FIG. 1, after route reflector 194 receives an acknowledgement signal indicating a successful route installation from network control entity 191, which is the only route target network control entity associated with the new route for forwarding data from compute device 150 to peripheral processing device 175, route reflector 194 is configured to send an acknowledgement signal to network management module 155, shown as signal 165 in FIG. 1.

In some embodiments, an error signal sent from route reflector 194 to network management module 155 can include information associated with the route target network control entities that are unsuccessful in installing the new route. In other words, route reflector 194 can indicate to network management module 155 at which route target network control entities the new route was not successfully installed. Thus, network management module 155, other controller devices, and/or a network administrator of the switch fabric system 100 can troubleshoot the network control entities that are unsuccessful in installing the new route, based on the information provided in the error signal sent from route reflector 194 to network management module 155.

In some embodiments, in response to receiving an acknowledgement signal from route reflector 194 indicating a successful installation of a new route at each route target network control entity associated with the new route, network management 155 can be configured to send a route update associated with the new route to route reflector 194, which can then be configured to forward the route update to each network control entity from a set of network control entities. In some embodiments, the set of network control entities that receive such a route update include one or more network control entities that are not a route target network control entity associated with the new route. For example, in response to receiving an acknowledgement signal from route reflector 194 indicating a successful installation of a new route at network control entity 191, where the new route is associated with forwarding data packets from compute device 150 to peripheral processing device 175, network management module 155 is configured to send a route update of the new route to network control entities 191, 192 and 193 via route reflector 194. As a result, network control entities 191, 192 and 193 update their routing table to include the information associated with the new route accordingly.

In some embodiments, after receiving an acknowledgement signal from route reflector 194 indicating a successful installation of a first new route at each route target network control entity associated with the first new route, network management 155 can be configured to send an instruction to install a second new route to route reflector 194, where the second new route uses the first new route as a reference route. Then, route reflector 194 can be configured to send the instruction to install the second new route to one or more route target network control entities that are associated with the second new route, such that the second new route can be delivered to and installed at those route target network control entities accordingly. For example, after receiving an acknowledgement signal from route reflector 194 indicating a successful installation of a first new route at network control entity 191, where the first new route is associated with forwarding data packets from compute device 150 to peripheral processing device 175, network management 155 is configured to send an instruction to install a second new route to route reflector 194, which is associated with forwarding data from peripheral processing device 171 to peripheral processing device 175 via compute device 150 (e.g., as an intermediary relay). The second new route is not installed at network control entity 193 (i.e., the route target network control entity for the second new route) unless the first new route has already been installed at network control entity 191 (i.e., the route target network control entity for the first new route), because the second new route uses the first new route as a reference route. Subsequently, route reflector 194 sends the instruction to install the second new route to network control entity 193 via an instruction signal, shown as signal 169 in FIG. 1, and then network control entity 193 is configured to install the second new route accordingly.

In some embodiments, the route update and/or the instruction to install a second new route that uses a previously-installed first new route as a reference route do not require an acknowledgement from route target network control entities that are intended to receive and take actions (e.g., update a routing table, install the second new route, etc.) on the route update and/or the instruction to install the second new route. That is, the control signals containing the route update and/or the instruction to install the second new route do not include an acknowledgement request like the instruction signals containing the instruction to install the first new route as described above. In these embodiments, route target network control entities will not send an acknowledgement signal or an error signal to route reflector 194 after receiving and taking actions on the route update and/or the instruction to install the second new route, and route reflector 194 will not send an acknowledgement signal or an error signal to network management module 155 either.

In some embodiments, information associated with installing a new route (e.g., instructions to install a new route, route updates, acknowledgement signals, etc.) can be distributed within the control plane of the switch fabric system 100 using a target higher level protocol (e.g., an application layer protocol) such as, for example, a border gateway protocol (BGP). In such embodiments, network management module 155, route reflector 194 and/or network control entities 191-193 can use such a higher level protocol in conjunction with any suitable lower level protocol (e.g., a data link layer protocol), such as, for example, Ethernet and/or Fibre channel, to send and/or receive the information associated with installing the new route. For example, route reflector 194 can be a BGP route reflector associated with the control plane of the switch fabric system 100, and can send an instruction to install a new route to a route target network control entity via a BGP instruction signal. Furthermore, while BGP can be implemented at the application layer, it can be used by route reflector 194 to send information associated with populating and/or updating a routing table (e.g., stored at network control entities 191-193) associated with a network layer. Using a targeted protocol, such as BGP, route reflector 194 can send the information associated with installing the new route to specific network control entities 191-193 (e.g., route target network control entities) while refraining from sending the information to other network control entities 191-193 (e.g., non-route target network control entities), as described in detail herein.

Figure 4:
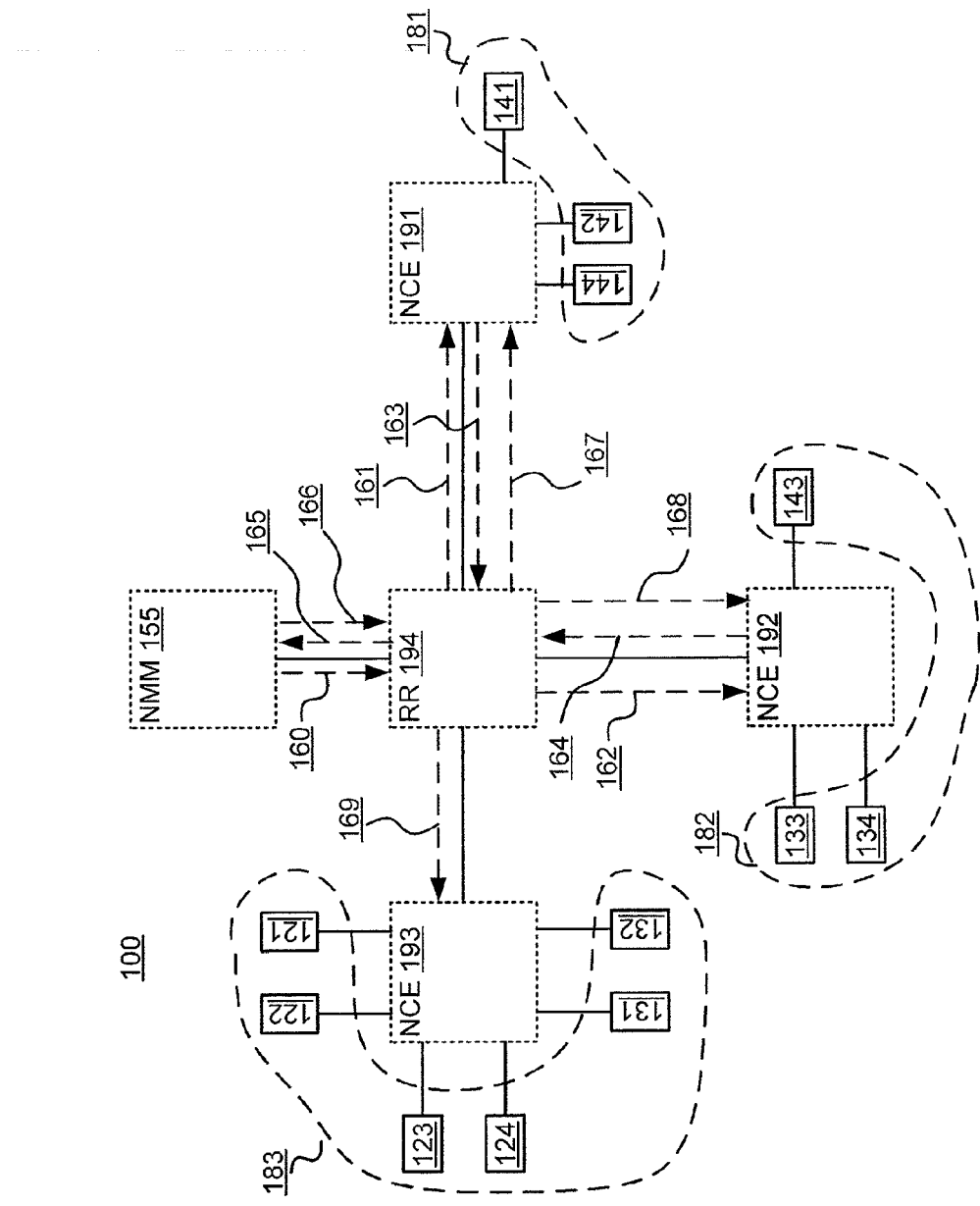
FIG. 4 is a block diagram of a logical topology of the control plane of the switch fabric system of FIG. 1.

FIG. 4, for example, is a block diagram of a logical topology of the control plane of the switch fabric system 100, shown in FIG. 1. As shown in FIG. 4, network control entities 191-193 are operatively coupled to network management module 155 through network control entity 194, and such a connection can be through a control plane portion of communications network 110. As described in detail with respect to FIG. 1, network management module 155 and route reflector 194 can be configured to distribute route information to, and receive acknowledgement signals associated with the distributed route information from, network control entities 191-193. Specifically, as shown in FIG. 4, route reflector 194 can be configured to function as an intermediary relay between network management module 155 and network control entities 191-193. For example, route reflector 194 can be configured to forward route information (e.g., instructions to install a route, route updates, etc.) received from network management module 155 to network control entities 191-193, receive acknowledgement signals from network control entities 191-193, send acknowledgement signals to network management module 155, etc.

Figure 5:
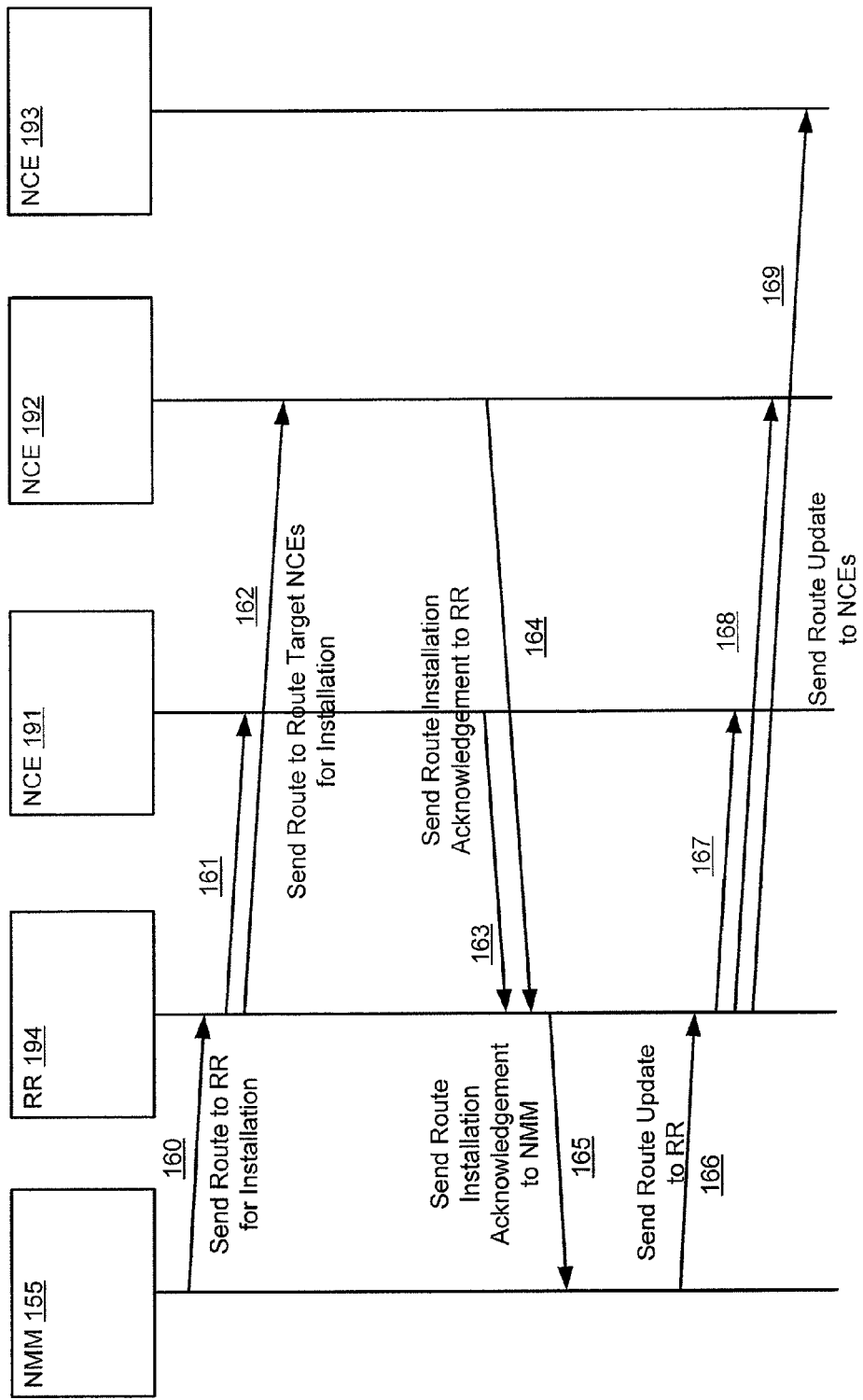
FIG. 5 is a logical representation of a series of operations for distributing route information in the control plane of the switch fabric system of FIG. 1.

FIG. 5 is a logical representation of a series of operations for distributing route information in the control plane of the switch fabric system 100, shown in FIG. 1. Specifically, FIG. 5 shows a logic representation, based on a timeline, of the series of operations that are shown in a system block diagram in FIG. 4. As shown in FIGS. 4-5, at the beginning, network management module 155 is configured to send an instruction to install a new route to route reflector 194 via an instruction signal, shown as signal 160 in FIGS. 4-5. The instruction to install sent from network management module 155 to route reflector 194 includes a route-target attribute that can indicate one or more route target network control entities associated with the new route to route reflector 194. Additionally, the instruction signal sent from network management module 155 to route reflector 194 includes an acknowledgement request, which requests route reflector 194 to send an acknowledgement signal or an error signal to network management module 155 to report a result of route installation at the route target network control entities.

For example, the new route can be associated with sending data packets from peripheral processing device 174, which is coupled to port 133 managed by network control entity 192 (shown in FIG. 1), to peripheral processing device 175, which is coupled to port 144 managed by network control entity 191 (shown in FIG. 1). As a result, the route-target attribute included in the instruction to install sent from network management module 155 to route reflector 194 indicates to route reflector 194 that the route target network control entities for the new route are associated with peripheral processing device 174 and/or peripheral processing device 175. In addition, the instruction signal containing the instruction to install includes an acknowledgement request.

After receiving the instruction to install via the instruction signal, route reflector 194 is configured to identify the route target network control entities based on the route-target attribute included in the instruction to install, and then store the information in a memory accessible to route reflector 194. Consequently, route reflector 194 is configured to send the instruction to install to each of the identified route target network control entities via a respective instruction signal. As a result of the instruction signal received at route reflector 194 from network management module 155 including an acknowledgement request, each instruction signal sent from route reflector 194 to a route target network control entity includes an acknowledgement request.

In the example of FIGS. 4-5, because the route-target attribute included in the instruction to install sent from network management module 155 to route reflector 194 via the instruction signal indicates that the route target network control entities for the new route are associated with peripheral processing device 174 and/or peripheral processing device 175, route reflector 194 is configured to identify network control entities 191, 192 as the route target network control entities. Consequently, route reflector 194 is configured to send an instruction to install the new route to network control entities 191 and 192, via a separate instruction signal to each, shown as signals 161 and 162, respectively, in FIGS. 4-5. Furthermore, each of the instruction signals sent from route reflector 194 to network control entities 191 and 192 includes an acknowledgement request.

In response to receiving the instruction to install the new route via the instruction signal, network control entities 191 and 192 are configured to install the new route accordingly. Specifically, network control entities 191 and 192 can store the route information in a data structure (e.g., a routing table, a database, etc.) within a memory of access switches 140 and 130, respectively, as shown in FIG. 1. After successfully installing the new route, because an acknowledgement request is included in each of the instruction signals sent from route reflector 194 to network control entities 191 and 192, network control entities 191 and 192 are configured to send acknowledgement signals to route reflector 194, respectively, shown as signals 163 and 164, respectively, in FIGS. 4-5. The acknowledgement signals can indicate to route reflector 194 that the new route has been successfully installed at network control entities 191 and 192.

After route reflector 194 receives the acknowledgement signals from network control entities 191 and 192, route reflector 194 is configured to retrieve the stored information associated with the route target network control entities for the new route, and then compare this information with the received acknowledgement signals. Consequently, route reflector 194 can determine that an acknowledgement signal indicating a successful installation of the new route has been received from each intended route target network control entity for the new route. Thus, route reflector 194 is configured to send an acknowledgement signal to network management module 155 to report the successful route installations at all intended route target network control entities. The acknowledgement signal sent from route reflector 194 to network management module 155 is shown as signal 165 in FIGS. 4-5.

After receiving from route reflector 194 the acknowledgement signal that indicates successful route installations at all intended route target network control entities associated with the new route, network management module 155 is configured to propagate a route update containing information associated with the newly-installed route to each network control entity within the switch fabric system 100. Specifically, network management module 155 sends an instruction to propagate the route update associated with the new route to route reflector 194 via an instruction signal, shown as signal 166 in FIGS. 4-5. Similar to the instruction to install the new route that is previously sent from network management module 155 to route reflector 194, the instruction to propagate the route update includes a route-target attribute, which indicates to route reflector 194 that the route update is intended to all network control entities within the switch fabric system 100. On the other hand, unlike the instruction signal conveying the instruction to install the new route, the instruction signal conveying the instruction to propagate the route update does not include an acknowledgement request. That is, an acknowledgement signal is not requested from route reflector 194 to network management module 155, and therefore, an acknowledgement signal is not requested from any route target network control entity to route reflector 194.

After route reflector 194 receives the instruction to propagate the route update from network management module 155 via the instruction signal, route reflector 194 is configured to identify that the route update is intended to be propagated to network control entities 191, 192 and 193 within the switch fabric system 100, based on the route-target attribute included in the instruction to propagate. Thus, route reflector 194 is configured to send the route update associated with the newly-installed route to network control entities 191, 192 and 193 via control signals, shown as signals 167, 168 and 169, respectively, in FIGS. 4-5. As a result, the information of the newly-installed route from peripheral processing device 174 to peripheral processing device 175 is spread to and updated at each network control entity within the switch fabric system 100.

Figure 6:
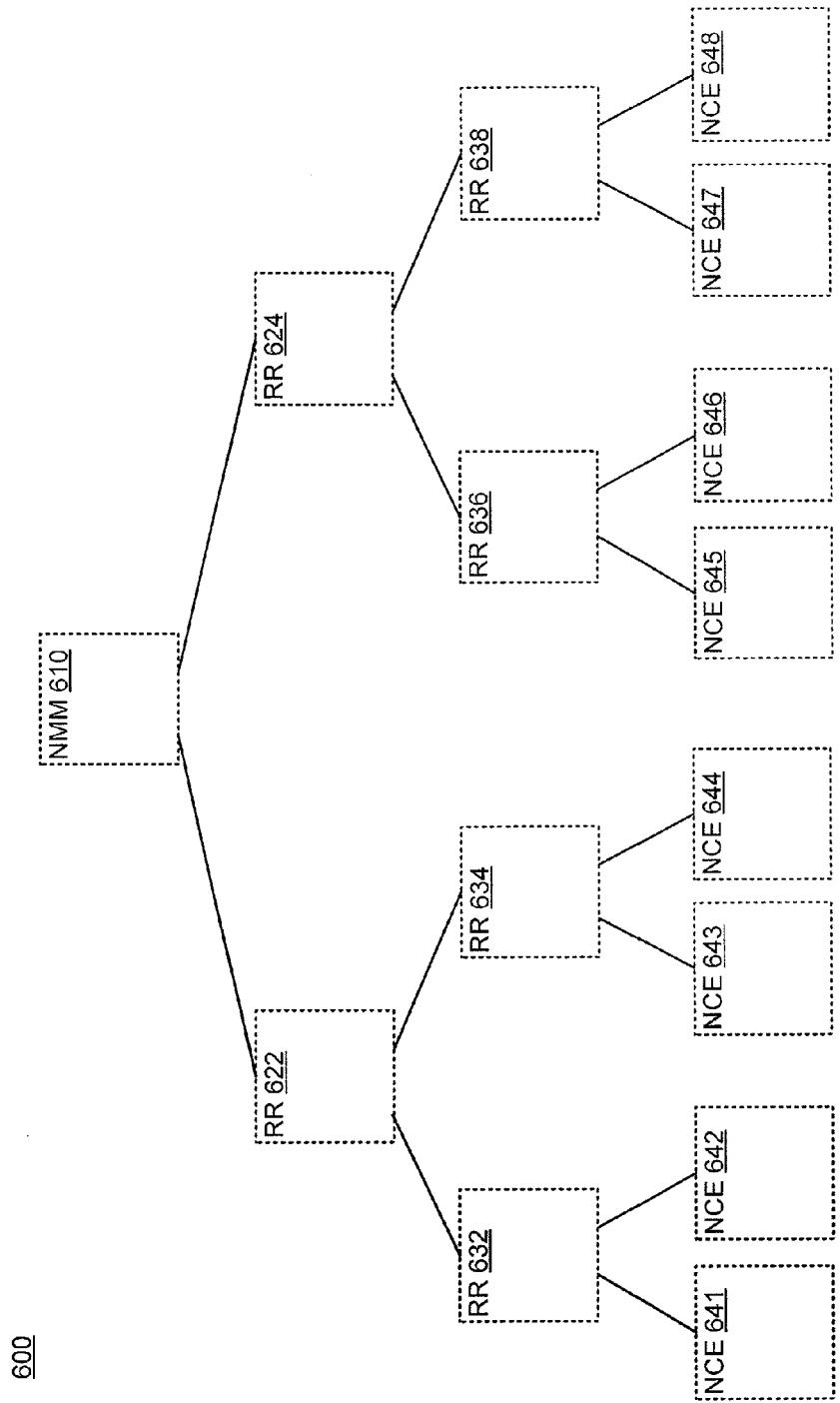
FIG. 6 is a logical representation of a control plane of a switch fabric system that includes multiple route reflectors, according to another embodiment.

FIG. 6 is a logical representation of a control plane of a switch fabric system 600 that includes multiple route reflectors, according to another embodiment. As shown in FIG. 6, the switch fabric system 600 includes a network management module 610, which is coupled to route reflectors 622, 624. Route reflector 622 is coupled to route reflectors 632 and 634, which are coupled to network control entities 641-642 and network control entities 643-644, respectively. Route reflector 624 is coupled to route reflectors 636 and 638, which are coupled to network control entities 645-646 and network control entities 647-648, respectively.

Similar to network management module 155 shown and described with respect to FIGS. 1, 4 and 5, network management module 610 can be configured to send route information (e.g., instructions to install a new route, route updates, etc.) to, or receive acknowledgement signals and/or error signals from, route reflectors 622 and 624, etc. Similar to route reflector 194 shown and described with respect to FIGS. 1, 4 and 5, route reflectors 622, 624, 632, 634, 636 and 638 can function as intermediary relays in distributing route information within the switch fabric system 600. Specifically, route reflectors 622 and 624 can be configured to receive route information from network management module 610, send the received route information to, or receive acknowledgement signals and/or error signals from, route reflectors 632, 634, 636 and 638, etc. Route reflectors 632, 634, 636 and 638 can be configured to receive route information from route reflectors 622 and 624, send the received route information to, or receive acknowledgement signals and/or error signals from, network control entities 641-648, etc. Similar to network control entities 191-193 shown and described with respect to FIGS. 1, 4 and 5, network control entities 641-648 can be configured to receive route information from route reflectors 632, 634, 636 and 638, take actions on the received route information (e.g., install a new route, update a routing table, etc.), or send an acknowledgement signal and/or an error signal to route reflectors 632, 634, 636 and 638, etc. In such a layered fashion similar to the mechanism described with respect to FIGS. 4-5, route information can be distributed from network management module 610 to network control entities 641-648 via the intermediary route reflectors, and feedback information associated with the distributed route information (e.g., acknowledgement signals, error signals, etc.) can be gathered from network control entities 641-648 to network management module 610 via the intermediary route reflectors.

Figure 7:
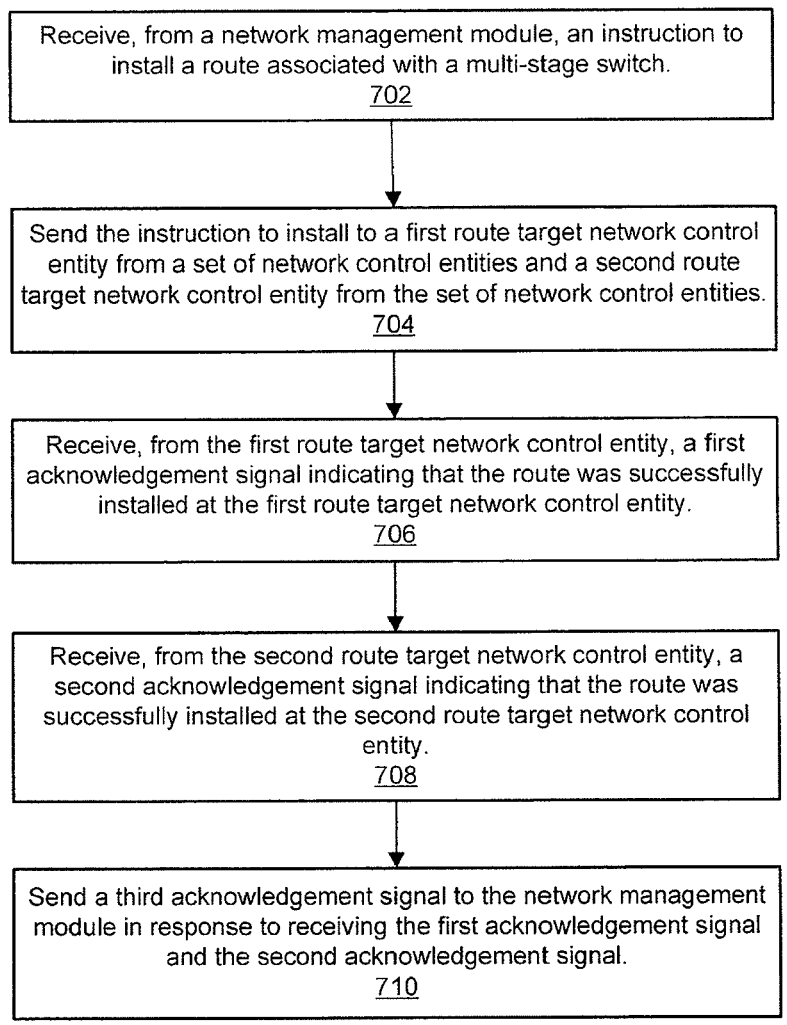
FIG. 7 is a flow chart illustrating a method of acknowledging route distribution and installation within a switch fabric system, according to an embodiment.

FIG. 7 is a flow chart illustrating a method of acknowledging route distribution and installation within a switch fabric system, according to an embodiment. At 702, an instruction to install a route associated with a multi-stage switch can be received from a network management module. Specifically, a route reflector operatively coupled to the network management module can be configured to receive the instruction to install the route via an instruction signal sent from the network management module. The route can be associated with the multi-stage switch fabric that hosts the network management module and the route reflector (e.g., in a compute device). The instruction to install received by the route reflector can include a route-target attribute that indicates one or more route target network control entities associated with the route. In some embodiments, the instruction signal can include an acknowledgement request, which requests the route reflector to send a feedback message, such as an acknowledgement signal or an error signal, to the network management module.

In the example of FIGS. 4-5, route reflector 194 is configured to receive an instruction to install a new route from network management 155 via an instruction signal (shown as signal 160 in FIGS. 4-5). The new route is associated with sending data from peripheral processing device 174, which is coupled to port 133 managed by network control entity 192, to peripheral processing device 175, which is coupled to port 144 managed by network control entity 191. The instruction to install received by route reflector 194 includes a route-target attribute, which indicates to route reflector 194 that the route target network control entities are associated with peripheral processing device 174 and/or peripheral processing device 175 (i.e., network control entities 191 and 192). Additionally, the instruction signal includes an acknowledgement request.

At 704, the instruction to install can be sent to a first route target network control entity from a set of network control entities and a second route target network control entity from the set of network control entities. After receiving the instruction to install, the route reflector can be configured to identify the route target network control entities associated with the route to be installed, based on the route-target attribute included in the received instruction to install. The route reflector can be then configured to store the identification information of the route target network control entities in a memory accessible to the route reflector. Subsequently, the route reflector can be configured to send the instruction to install to each identified route target network control entity, for example, a first network control entity and a second network control entity from a set of network control entities. Additionally, the instruction to install can be sent to the first and the second network control entities via an instruction signal, which includes an acknowledgement request to each of the two network control entities.

In the example of FIGS. 4-5, after receiving the instruction to install, route reflector 194 is configured to identify two route target network control entities associated with the new route (i.e., network control entities 191 and 192) based on the route-target attribute included in the received instruction to install. Route reflector 194 is then configured to store the identification information of the two route target network control entities in a memory accessible to route reflector 194 (e.g., a memory within compute node 150). Subsequently, route reflector 194 is configured to send the instruction to install to network control entities 191 and 192 via an instruction signal to each, shown as signals 161 and 162, respectively, in FIGS. 4-5. Additionally, each of the instruction signals sent from route reflector 194 to network control entities 191 and 192 includes an acknowledgement request.

At 706, a first acknowledgement signal can be received from the first route target network control entity, which indicates that the route was successfully installed at the first route target network control entity. After receiving the instruction to install from the route reflector, the first route target network control entity can be configured to install the route accordingly. Because the instruction signal received at the first route target network control entity includes an acknowledgement request, the first route target network control entity can be configured to send a first acknowledgement signal to the route reflector in response to successfully installing the route. The first acknowledgement signal can indicate to the route reflector that the route has been successfully installed at the first route target network control entity. Thus, the route reflector can receive the first acknowledgement signal, and further determine that the route was successfully installed at the first route target network control entity based on the first acknowledgement signal.

In the example of FIGS. 4-5, after receiving the instruction to install from route reflector 194, network control entity 191 is configured to install the route accordingly. After successfully installing the route, network control entity 191 is configured to send a first acknowledgement signal (shown as signal 163 in FIGS. 4-5) to route reflector 194, indicating the successful installation of the route at network control entity 191. As a result, route reflector 194 receives the first acknowledgement signal from network control entity 191, and further determines that the route was successfully installed at network control entity 191 based on the first acknowledgement signal.

At 708, a second acknowledgement signal can be received from the second route target network control entity, which indicates that the route was successfully installed at the second route target network control entity. Similar to the first route target network control entity, after receiving the instruction to install from the route reflector, the second route target network control entity can be configured to install the route accordingly. In response to successfully installing the route, the second route target network control entity can also be configured to send a second acknowledgement signal to the route reflector. Similar to the first acknowledgement signal, the second acknowledgement signal can indicate to the route reflector that the route has been successfully installed at the second route target network control entity. Thus, the route reflector can receive the second acknowledgement signal, and further determine that the route was successfully installed at the second route target network control entity based on the second acknowledgement signal.

In the example of FIGS. 4-5, similar to network control entity 191, after receiving the instruction to install from route reflector 194, network control entity 192 is configured to install the route accordingly. After successfully installing the route, network control entity 192 is configured to send a second acknowledgement signal (shown as signal 164 in FIGS. 4-5) to route reflector 194, indicating the successful installation of the route at network control entity 192. As a result, route reflector 194 receives the second acknowledgement signal from network control entity 192, and further determines that the route was successfully installed at network control entity 192 based on the second acknowledgement signal.

At 710, a third acknowledgement signal can be sent to the network management module in response to receiving the first acknowledgement signal and the second acknowledgement signal. After receiving the first and the second acknowledgement signals, the route reflector can be configured to retrieve the stored infoiuiation of the route target network control entities for the new route, and then compare the information with the received acknowledgement signals. As a result, the route reflector can determine that an acknowledgement signal has been received from every route target network control entity for the installed route. Thus, the route reflector can be configured to send a third acknowledgement signal to the network management module to report that the route has been successfully installed at all route target network control entities for the installed route.

In the example of FIGS. 4-5, after receiving the first and the second acknowledgement signals from network control entities 191 and 192, route reflector 194 is configured to retrieve the stored information of the route target network control entities for the new route, and then compare the information with the received acknowledgement signals. As a result, route reflector 194 determines that acknowledgement signals have been received from both route target network control entities (i.e., network control entities 191 and 192). Thus, route reflector 194 is configured to send a third acknowledgement signal (shown as signal 165 in FIGS. 4-5) to network management module 155 to report that the route has been successfully installed at all the route target network control entities.

While shown and described above with respect to FIGS. 1-7 as instructions to install a new route being distributed to and executed accordingly at route target network control entities, in other embodiments, instructions to take other actions on a route (e.g., withdraw a route, modify a route) can also be distributed to and executed accordingly at route target network control entities in a similar way. For example, an instruction to withdraw a route can be distributed from a network management module, via a route reflector, to a set of network control entities, which have information associated with this route stored in their routing tables. The instruction can then be executed at each network control entity from the set of network control entities, such that the information associated with the route is removed from the routing table of the network control entity. Furthermore, after successfully removing the route information from its routing table, each network control entity from the set of network control entities can be configured to send an acknowledgement signal to the route reflector, indicating the successful withdraw of the route at the network control entity. After receiving such an acknowledgement signal from every network control entity from the set of network control entities, the route reflector can be configured to send an acknowledgement signal to the network management module. Thus, the network management module is informed that the route is completely withdrawn (i.e., removed from every routing table of every network control entity).

While shown and described above with respect to FIGS. 1-7 as an instruction to install carried by an instruction signal including the instruction to install only one route, in other embodiments, an instruction to install carried by an instruction signal can include instruction(s) to install more than one route. Furthermore, each route included in such an instruction to install can be associated with a unique set of route target network control entities. Upon receiving such an instruction to install, a route reflector can be configured to identify the unique set of route target network control entities for each route, and then forward the instruction to install each route to the corresponding set of route target network control entities.

While shown and described above with respect to FIGS. 1 and 3 as a network management module and a route reflector being included in a compute device, in other embodiments, a network management module and a route reflector that functions as an intermediary relay for the network management module can be located separately, for example, at different devices. For example, the network management module can be hosted by a compute device, and the route reflector can be hosted by an access switch that is directly coupled to the compute device. Thus, the network management module can communicate with the route reflector by sending route information from the compute device to the access switch, and/or receiving feedback information from the access switch to the compute device.

While shown and described above with respect to FIGS. 1-7 as one or more route reflectors being used as an intermediary relays to distribute route information (e.g., instructions to install a new route, route updates, etc.) between a network management module and one or more route target network control entities, in other embodiments, a network management module can distribute route information directly to one or more route target network control entities without a relay of a route reflector between the network management module can the route target network control entities. In such embodiments, the network management module is able to identify the route target network control entities, and then send the route information directly to the route target network control entities. On the other hand, the route target network control entities can be configured to send feedback messages (e.g., acknowledgement signals, error signals, etc.) directly to the network management module.

While shown and described above with respect to FIG. 6 as the route reflectors functioning as two layers of relays between a network management module and a set of network control entities (i.e., a first layer of route reflectors including route reflectors 622, 624, and a second layer of route reflectors including route reflectors 632, 634, 636, 638, as shown in FIG. 6), in other embodiments, more than two layers of route reflectors can function as relays between one or more network management modules and one or more network control entities. Alternatively, route reflectors and/or other network devices (e.g., network management modules, network control entities, etc.) can be organized in an arbitrary topology within a multi-stage switch fabric system. In such embodiments, each route reflector and/or other network device functions in a similar way as described herein. For example, a route reflector can be configured to receive route information (e.g., instructions to install a route, route updates, etc.) from a network management module or another route reflector, send route information to another route reflector or a network control entity, receive feedback information (e.g., acknowledgement signals, error signals) from another route reflector or a network control entity, etc., regardless of the topology of route reflectors and/or other network devices in the multi-stage switch fabric system.

Embodiments shown and described above refer to multiple peripheral processing devices, including compute nodes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a route reflector implemented in at least one of a memory or a processing device, the route reflector configured to receive, from a network management module, an instruction to install a route associated with a multi-stage switch, the route reflector configured to send the instruction to install the route to a first route target network control entity associated with the multi-stage switch and a second route target network control entity associated with the multi-stage switch,
the route reflector configured to receive, from the first route target network control entity, a first acknowledgement signal indicating that the route was successfully installed at the first route target network control entity,
the route reflector configured to receive, from the second route target network control entity, a second acknowledgement signal indicating that the route was successfully installed at the second route target network control entity,
the route reflector configured to send a third acknowledgement signal to the network management module in response to receiving both the first acknowledgement signal and the second acknowledgement signal.

2. The apparatus of claim 1, wherein the route reflector is configured to send the third acknowledgment signal to the network management module such that the network management module sends a route update associated with the route to each network control entity from a plurality of network control entities associated with the multi-stage switch in response to receiving the third acknowledgment signal.

3. The apparatus of claim 1, wherein the route reflector is configured to receive, from the network management module, an instruction to propagate a route update associated with the route to each network control entity from a plurality of network control entities associated with the multi-stage switch, the plurality of network control entities including the first route target network control entity, the second route target network control entity and at least one non-route target network control entity.

4. The apparatus of claim 1, wherein the route reflector sends the instruction to install via a Border Gateway Protocol (BGP) instruction signal.

5. The apparatus of claim 1, wherein the route reflector sends the instruction to install via an instruction signal including an acknowledgement request.

6. The apparatus of claim 1, wherein the route reflector is a Border Gateway Protocol (BGP) route reflector associated with a control plane of the multi-stage switch.

7. The apparatus of claim 1, wherein the route is associated with at least one of a link aggregation group (LAG) membership update or a multicast flood tree update.

8. The apparatus of claim 1, wherein the route reflector is configured to send the third acknowledgement signal to the network management module if both the first acknowledgement signal and the second acknowledgement signal are received by the route reflector within a predetermined amount of time.

9. The apparatus of claim 1, wherein the route reflector is configured to send an error signal to the network management module if at least one of the first acknowledgement signal or the second acknowledgement signal is not received by the route reflector within a predetermined amount of time.

10. A non-transitory processor-readable medium storing code representing instructions to be executed by a processor, the code comprising code to cause a processor to:

receive, from a network management module, an instruction to install a route associated with a multi-stage switch, send the instruction to install the route to a first route target network control entity from a plurality of network control entities and a second route target network control entity from the plurality of network control entities;

receive, from the first route target network control entity, a first acknowledgement signal indicating that the route was successfully installed at the first route target network control entity;

receive, from the second route target network control entity, a second acknowledgement signal indicating that the route was successfully installed at the second route target network control entity; and send, in response to receiving both the first acknowledgement signal and the second acknowledgement signal, a third acknowledgement signal to the network management module indicating that the route was successfully installed at the first route target network control entity and the second route target network control entity.

11. The non-transitory processor-readable medium of claim 10, wherein the plurality of network control entities is associated with a control plane of the multi-stage switch.

12. The non-transitory processor-readable medium of claim 10, further comprising code representing instructions to cause the processor to:

receive, from the network management module and in response to the third acknowledgement signal, an instruction to send a route update associated with the route to each network control entity from the plurality of network control entities; and send, in response to receiving the instruction to send, the route update to each network control entity from the plurality of network control entities.

13. The non-transitory processor-readable medium of claim 10, wherein the instruction to install the route includes an acknowledgement request.

14. The non-transitory processor-readable medium of claim 10, wherein the instruction to install is sent to the first route target network control entity using a Border Gateway Protocol (BGP) instruction signal.

15. The non-transitory processor-readable medium of claim 10, wherein the route is associated with at least one of a link aggregation group (LAG) membership update or a multicast flood tree update.

16. An apparatus, comprising:

a route reflector implemented in at least one of a memory or a processing device, the route reflector configured to send an instruction to install a route associated with a multi-stage switch to a first route target network control entity and a second route target network control entity from a plurality of network control entities associated with a control plane of the multi-stage switch, the route reflector configured to send a first acknowledgment signal to a network management module if both a second acknowledgement signal indicating that the route was successfully installed at the first route target network control entity and a third acknowledgement signal indicating that the route was successfully installed at the second route target network control entity are received by the route reflector within a predetermined amount of time, the route reflector configured to send an error signal to the network management module if at least one of the second acknowledgement signal or the third acknowledgement signal is not received by the route reflector within the predetermined amount of time.

17. The apparatus of claim 16, wherein the route reflector is a Border Gateway Protocol (BGP) route reflector associated with the control plane of the multi-stage switch.

18. The apparatus of claim 16, wherein the route is associated with at least one of a link aggregation group (LAG) membership update or a multicast flood tree update.

19. The apparatus of claim 16, wherein the route reflector is configured to receive, from the network management module, an instruction to send a route update associated with the route to each network control entity from the plurality of network control entities in response to the network management module receiving the first acknowledgement signal.

20. The apparatus of claim 16, wherein the route reflector is configured to receive an instruction to install the route from the network management module prior to sending the instruction to install the route to the first route target network control entity and the second route target network control entity.

* * * * *